US011019178B1

(12) United States Patent
Ravindran

(10) Patent No.: US 11,019,178 B1
(45) Date of Patent: May 25, 2021

(54) DEPLOYMENT ROUTER BASED ON CHANNEL TRAFFIC

(71) Applicant: West Corporation, Omaha, NE (US)

(72) Inventor: Sarath Kumar Ravindran, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 13 days.

(21) Appl. No.: 16/241,645

(22) Filed: Jan. 7, 2019

(51) Int. Cl.
*G06F 15/16* (2006.01)
*H04L 29/08* (2006.01)
*G06F 8/60* (2018.01)
*G10L 15/22* (2006.01)

(52) U.S. Cl.
CPC .............. *H04L 67/327* (2013.01); *G06F 8/60* (2013.01); *G10L 15/22* (2013.01); *H04L 67/14* (2013.01); *G10L 2015/223* (2013.01)

(58) Field of Classification Search
USPC ......................................................... 709/219
See application file for complete search history.

(56) References Cited

U.S. PATENT DOCUMENTS

| 7,751,315 B1 * | 7/2010 | Pai ...................... H04L 12/2801 370/230 |
| 7,761,547 B2 * | 7/2010 | Matsubara .............. H04L 67/12 709/223 |
| 8,649,268 B2 * | 2/2014 | Lawson .............. H04L 65/1069 370/236 |
| 9,379,903 B1 * | 6/2016 | McAlister ............. H04L 41/042 |
| 9,621,678 B1 * | 4/2017 | Guastaferro ............ H04L 69/28 |
| 10,552,796 B1 * | 2/2020 | Delacourt .............. G06Q 10/06 |
| 2002/0143954 A1 * | 10/2002 | Aiken, Jr. ............. H04L 69/163 709/227 |
| 2009/0327460 A1 * | 12/2009 | Yoo ...................... H04L 67/1002 709/221 |
| 2012/0030672 A1 * | 2/2012 | Zygmuntowicz ......... G06F 8/60 718/1 |
| 2012/0102086 A1 * | 4/2012 | Miyata .................... G06F 9/505 709/201 |
| 2013/0067448 A1 * | 3/2013 | Sannidhanam ........... G06F 8/60 717/169 |
| 2014/0280486 A1 * | 9/2014 | Seay ....................... H04L 67/02 709/203 |
| 2015/0012494 A1 * | 1/2015 | Jewell ................. G06F 11/1456 707/638 |
| 2015/0178059 A1 * | 6/2015 | Lindheimer ............ H04L 67/10 717/178 |
| 2016/0294954 A1 * | 10/2016 | Khayrudinov .... H04L 29/06319 |
| 2017/0006021 A1 * | 1/2017 | Karaatanassov .... H04L 63/0815 |
| 2017/0026535 A1 * | 1/2017 | Tarumi ............... H04N 1/00923 |
| 2018/0123986 A1 * | 5/2018 | Faulkner ............. H04L 12/1818 |
| 2018/0159954 A1 * | 6/2018 | Lu ......................... H04L 67/327 |
| 2018/0314515 A1 * | 11/2018 | de Kruijf ................ H04L 67/34 |
| 2019/0075176 A1 * | 3/2019 | Nguyen ................. H04W 4/18 |

(Continued)

*Primary Examiner* — Anthony Mejia

(57) ABSTRACT

An example method of operation may include receiving a request from a network, identifying a state of a system coupled to the network, determining a status of the request from the network, and routing the request to a first application when the system is in a predetermined state and the request has a first status and routing the request to a second application when the system is in a state different from the predetermined state and the request has a second status.

15 Claims, 5 Drawing Sheets

(56) References Cited

U.S. PATENT DOCUMENTS

| | | | |
|---|---|---|---|
| 2019/0199796 A1* | 6/2019 | Smith | H04L 67/2842 |
| 2019/0213004 A1* | 7/2019 | Zhu | G06F 8/71 |
| 2019/0250949 A1* | 8/2019 | Chen | H04L 41/082 |
| 2019/0324786 A1* | 10/2019 | Ranjan | G06F 9/4856 |
| 2019/0384469 A1* | 12/2019 | Lo | G06F 16/9535 |
| 2020/0264858 A1* | 8/2020 | Li | G06F 9/44505 |

* cited by examiner

DEPLOYMENT ROUTER BASED ON CHANNEL TRAFFIC

TECHNICAL FIELD OF THE APPLICATION

One or more embodiments described herein relate to managing applications and processing information in a computing system.

BACKGROUND OF THE APPLICATION

Virtually every individual and business these days uses an information processing system that is based at least partially on software. Over time, the software may be updated or changed to incorporate improvements or enhance functionality.

In order to perform an update or change, the software may be made unavailable for a time. This introduces delays and other inefficiencies which are costly, especially when the software is used to service users on a network. For example, a business which uses an application to process information and requests from customers must discontinue service for a time in order to allow the application to be updated or changed.

One attempt to solve this problem is to keep the application in service while processing information and requests from customers. Using this method, a zero downtime of the application is not possible. However, there are times when updating or changing an application while processing requests is desirable.

SUMMARY OF THE APPLICATION

Example embodiments of the present application provide a method which includes receiving a request from a network, identifying a state of a system coupled to the network, determining a status of the request from the network, and routing the request to a first application when the system is in a predetermined state and the request has a first status and routing the request to a second application when the system is in a state different from the predetermined state and the request has a second status.

Another example embodiment may provide an apparatus which includes an interface to receive a request from a network and a router to determine a state of a system coupled to the network and a status of the request. The router routes the request to a first application when the system is in a predetermined state and the request has a first status, and routes the request to a second application when the system is in a state different from the predetermined state and the request has a second status.

Another example embodiment may provide a non-transitory computer readable storage medium that stores instructions that when executed cause a processor to receive a request from a network, identify a state of a system coupled to the network, determine a status of the request from the network, and route the request to a first application when the system is in a predetermined state and the request has a first status and route the request to a second application when the system is in a different state and the request has a second status.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, the term "computer" or "terminal" as used herein may refer to any type of computing device or logic capable of running applications or other software. The computing device or logic may be (or be included in) a notebook, laptop, or desktop computer operating on a standalone or network-connected basis, a server, a console, or a mobile device including but not limited to a personal digital assistant, cell phone, telephone, tablet, smartphone, television, monitor, camera, security device, home system controller, appliance, navigation device, gaming system, or another computing device, or combination of devices.

Figure 1:
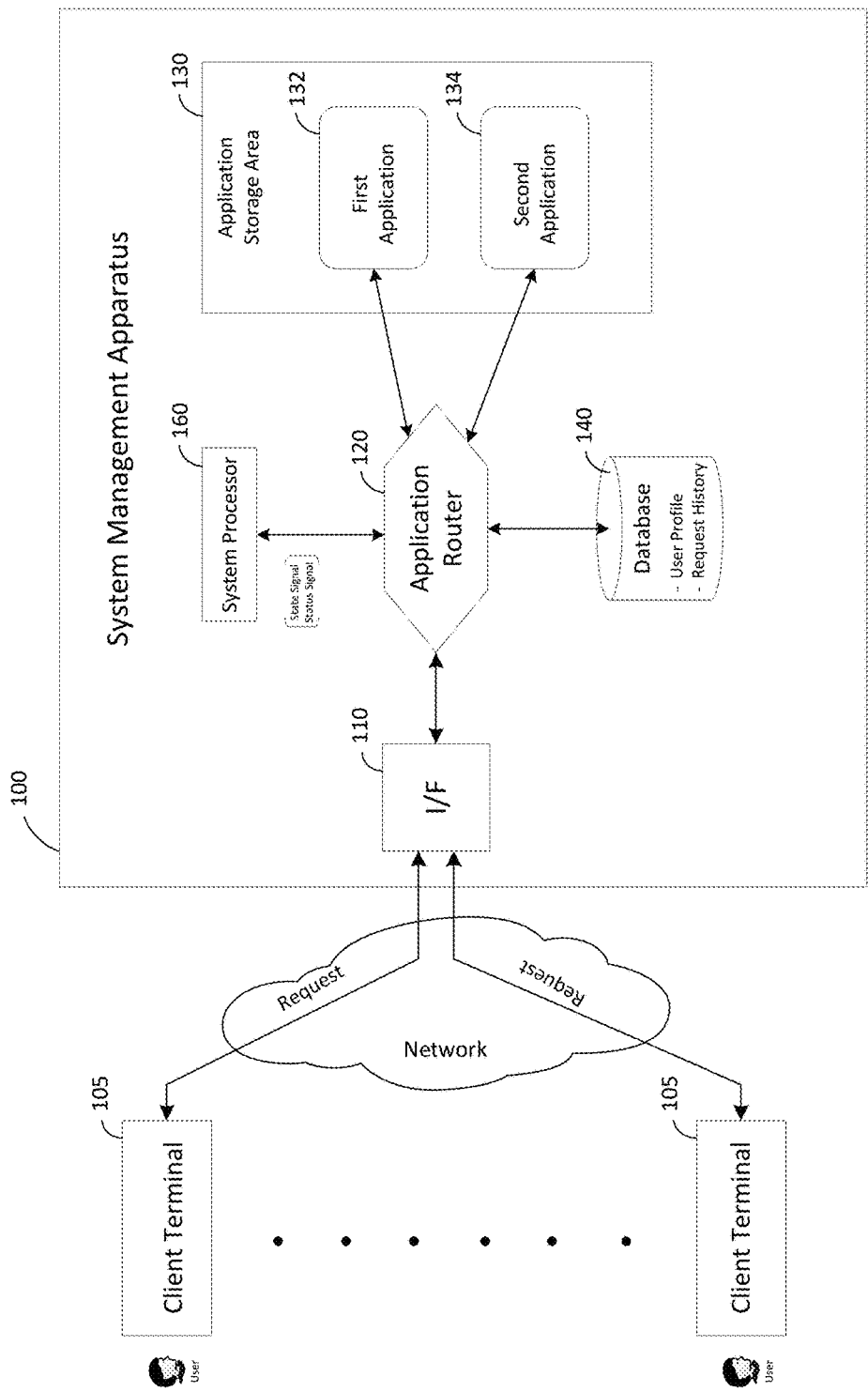
FIG. 1 shows an embodiment of an apparatus to manage requests and applications in a system coupled to a network.

FIG. 1 shows an embodiment of an apparatus 100 for managing information and applications in a system. The system may be a standalone system or one coupled to a network. The network may be any network including, but not limited to, a cloud-based network, a wide area network (e.g., the internet), a virtual private network, a local area network, or another type of wired or wireless network that processes information and receives information from one or more client terminals.

Referring to FIG. 1, the system management apparatus 100 includes an interface 110, an application router 120, and an application storage area 130.

The interface 110 may be any type of interface capable of receiving electronic requests, information, or other types of signals. In one embodiment, the interface 110 may be compatible with the type of network apparatus 100 is linked to or may include an intervening converter. In operation, the interface 110 receives information and requests from one or more client terminals 105. The client terminals may be, for example, any of the computers or terminals previously described (e.g., personal or handheld devices, smart phones, tablets, telephones, VoIP devices) or another device for receiving information and sending requests.

The information and requests (generally referred to as requests) may be generated by a user of a client terminal or may be automatically generated by the terminal. In this latter case, for example, the processing logic of the client terminal may automatically communicate with the system controlled by apparatus 100, either with the knowledge of or transparent to the user. When the client terminal is a telephone, smart phone, or another type of device that makes calls, the requests may be conveyed, for example, as audio signals (e.g., voice input of the user, a tone of one or more dialed letters or numbers, etc.). When the client terminal is another type of computing or communication device, the requests may be sent, for example, as textual information, an electronic menu selection, a clicked hyperlink, computer-readable instructions or code, or another type of electronic information that may be interpreted by the system management apparatus.

The application router 120 processes the requests received by the interface 110 and manages subsequent system communications with the client terminals 105. In one embodiment, the application router 120 controls the type of processing to be performed during communication sessions with the client terminals. This may be accomplished, for example, by routing management of each communication session to different applications based on certain conditions or parameters.

The applications may process or otherwise manage the communication session differently. The communication session may involve processing a call in an interactive voice response system, processing information in connection with purchases from a retailer, managing customer service requests, guiding users through menu selections, or some other form of processing controlled by an application.

In one embodiment, the application router 120 may include logic (e.g., software, hardware, or both) located at a front-end of the processing architecture of the system, with the applications located downstream in the process flow. In operation, the application router 120 may retrieve information indicative of one or more conditions or parameters from a database 140 or other storage area that controls how the router 120 will operate to route a communication session with each client terminal.

The application router 120 may store other information to assist in managing communication sessions. Examples include user profile information, subscription information, history and data relating to previous and/or current communication sessions, payment and billing information, available discounts, product information, user logs, and customer service details, as well as other information. This additional information may be taken into consideration when routing a request to one of the applications in the application storage area 130.

The application storage area 130 may store the applications to be used in managing and processing the requests routed by the application router 120. The applications may be, for example, customer relation management software, voice menu software, a customer service processing program, a purchasing or invoicing program, or another type of program that processes or otherwise manages requests from a client terminal.

In the example embodiment of FIG. 1, the application storage area 130 includes a first application 132 and a second application 134. These applications may be different versions of the same application, e.g., the first application 132 may be an earlier version of the second application 134. In this case, the second application 134 may be considered to be an updated version of the earlier version 132. The updated version 134 may be functionally different from application 132 in one or more ways, and/or may perform the same functions in a different or more efficient manner. In another embodiment, the applications may be different applications that manage the information and request from the client terminals differently using different algorithms or processing techniques. In one embodiment, three or more applications may be included in the application storage area 30 that represent one or more of the various types of applications mentioned above.

Figure 2:
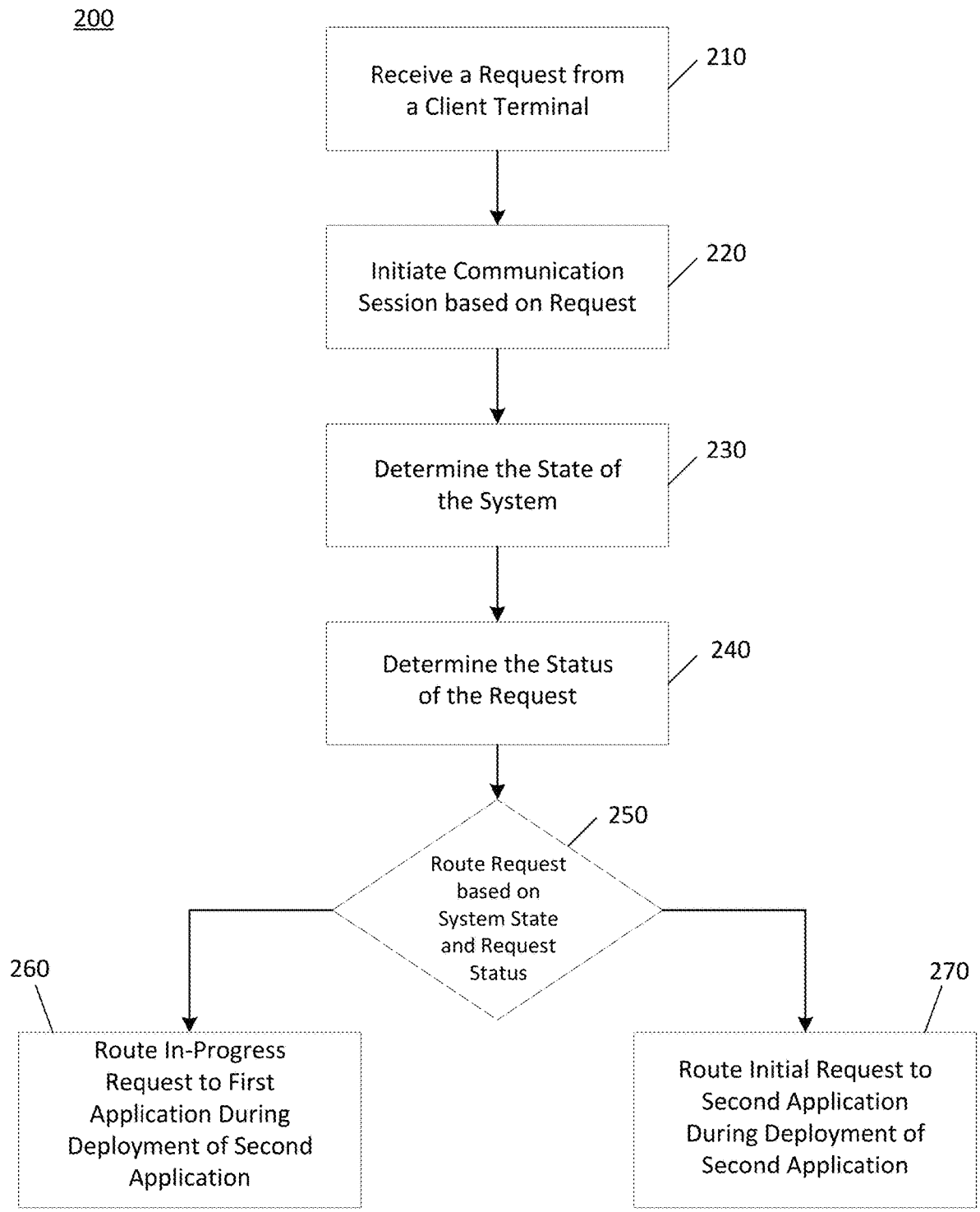
FIG. 2 shows an embodiment of a method to manage requests and applications in a system coupled to a network.

FIG. 2 shows an embodiment of a method 200 for managing information and applications in a system coupled to a network. The method may be performed, in whole or part, by the apparatus 100 of FIG. 1 or by a different apparatus. For illustrative purposes, the method 200 will be described with reference to apparatus 100.

At 210, the interface 110 receives information or a request from one of the client terminals 105. The information may be specific to the type of applications or system managed by apparatus 100. For example, when apparatus 100 includes customer relations management (CRM) software, the information may include product or billing information or a question for customer service. The system may be a financial system, a health-care system, an on-line retailer, technical support, or another system. The request may be a request regarding any of the above, whether communicated in a call or by electronic (e.g., network) signals. As used herein, the terms "request" and "information" may be used interchangeably, at least in respect to communications that take place between apparatus 100 and respective ones of the client terminals 105.

The interface is able to receive information and requests from multiple terminals 105 simultaneously, but may perform processing on a client terminal-by-client terminal basis. In one example, the interface 110 may be located at a call center or customer service center of a company. In another example, interface 110 may be located at a server managing the website of a company. In either case, the company may be a retailer, utility, government office, or other private or public entity, and the customers or clients may be users of the client terminals 105.

When received in a call, the information and requests may be received through a public switched telephone network (PSTN), voice-over-IP (VoIP) network, a call streaming application, or any other type of network that manages calls. In another embodiment, the requests may be received through a data network such as the Internet or another type of wired or wireless network. In one implementation, the interface 110 may be in or coupled to an interactive voice response (IVR) system or voice XML (VXML) system, an example of which will be discussed in greater detail below.

At 220, once interface 110 receives information or a request from a client terminal 105, a communication session may be initiated and control may be passed to the application router 120. This may be accomplished, for example, by processing logic (in the interface, system processor, call manager, or another features) that controls process flow in the apparatus 100. The information or request from the interface 110 may be passed to the application router 120 upon receipt, e.g., immediately upon receiving a call or after some information has been received, either during the call or from the internet or other network, or some pre-processing operations may be performed, such as determining the type or nature of the call prior to hand-off to the application router 120.

The application router 120 makes a decision as to which application the request is to be routed. This decision is made based on logic that takes one or more conditions or parameters into consideration. In one embodiment, the application router 120 makes a routing decision based on: (1) the state of the system in or coupled to apparatus 100 and (2) the status of the request from the network (or received if the system is a standalone system).

At 230, the state of the system may be determined, for example, based on a state signal from a system processor 160, e.g., see FIG. 1. The state signal may indicate, for example, that an update or change to the second application 134 is currently being deployed (e.g., a later version of the first application 132 or a new or revised version of the second application 134). During this period of deployment, the second application 134 may not be available to receive or manage requests from the client terminals, or may only be able to manage a certain limited number of requests. The system processor 160 may send the state signal to the application router 120 through a signal line 150 when queried by the router. Additionally, or alternatively, the system processor 160 may automatically send the state signal to the application router periodically or during the period of deployment.

In one embodiment, the system processor 160 may set a flag or store bits of information indicative of the current state of the system, e.g., whether the system is in a period of deployment for second application 134 or in a different (non-deployment) period. In this case, the application router 120 may access the flag or stored bits when making a routing decision concerning the requests processed from the client terminals. The flag or bits may be stored in a buffer, register, memory, or database 140 for access by the application router 120. In FIG. 1, the application router 120 and system processor 160 are shown as separate logic. In another embodiment, the application router 120 and system processor 160 may be included in the same logic.

At 240, the status of the request is determined based on management data maintained, for example, by system processor 160. In one embodiment, the system processor 160 monitors the status of requests received by the interface 110, which may or may not have been routed to one of the applications 132 or 134 yet. The status of the request may indicate, for example, whether the request is an initial request or an in-progress request. An initial request may be a request received during the period of deployment of the second application 134. An in-progress request may be a request received before the period of deployment of the second application 134 and management of the request is still active and on-going into the deployment period.

The system processor 160 may output a status signal indicating this information to the application router 160 when queried by the router, periodically, or when the call is first received. In another embodiment, the system processor 160 may store status information for the request in a buffer, register, memory, or database 140. When the request is received in the form of a call, the system processor 160 may be a call processor or other management logic.

At 250, the application router 120 determines whether to route the request to the first application 132 or the second application 134 based on the state of the system and the status of the request.

At 260, the application router 120 routes the request to the first application 132 when the system is in a period of deployment of the second application 134 and the request is an in-progress request. In other words, the application router 120 routes on-going or in-progress calls to the first application 132 during a time when the second application 134 is being deployed.

At 270, the application router 120 routes the request to the second application 134 when the system is in a period of deployment of the second application 134 and the request is an initial request. In other words, the application router 120 routes a call initially received during the period of deployment of the second application 134 to the second application. In one example, the deployment period may be a period when the application (or corresponding computer product) is pushed into a live environment where end users are still accessing it. One or more embodiments described herein ensure that no end user is adversely impacted (e.g., no discontinuity in service) during this period when, for example, a switch is being performed from the first application to the second application, e.g., from an old version to a new version of the application.

These embodiments improve the operation of the system in several respects. For example, the application router 120 allows access to the second application 134 to be temporarily suspended, or available to manage only a limited number of requests, during a period of deployment of the second application 134. When this occurs, a situation which may be referred to as zero downtime, the first application may be used to manage requests that the second application does not handle during the deployment period. Thus, the application router 120 allows service to users and management of requests to continue in a manner that is seamless and transparent to users, even during the period when the second application is being deployed.

Such a zero downtime is not possible in other systems. In these systems, only one request-handling application is used and that application must be shut off during the deployment period. This introduces delays and other inefficiencies, and makes the system unable to provide continuous service to requesters, at least during deployment of the request-handling application.

Figure 3:
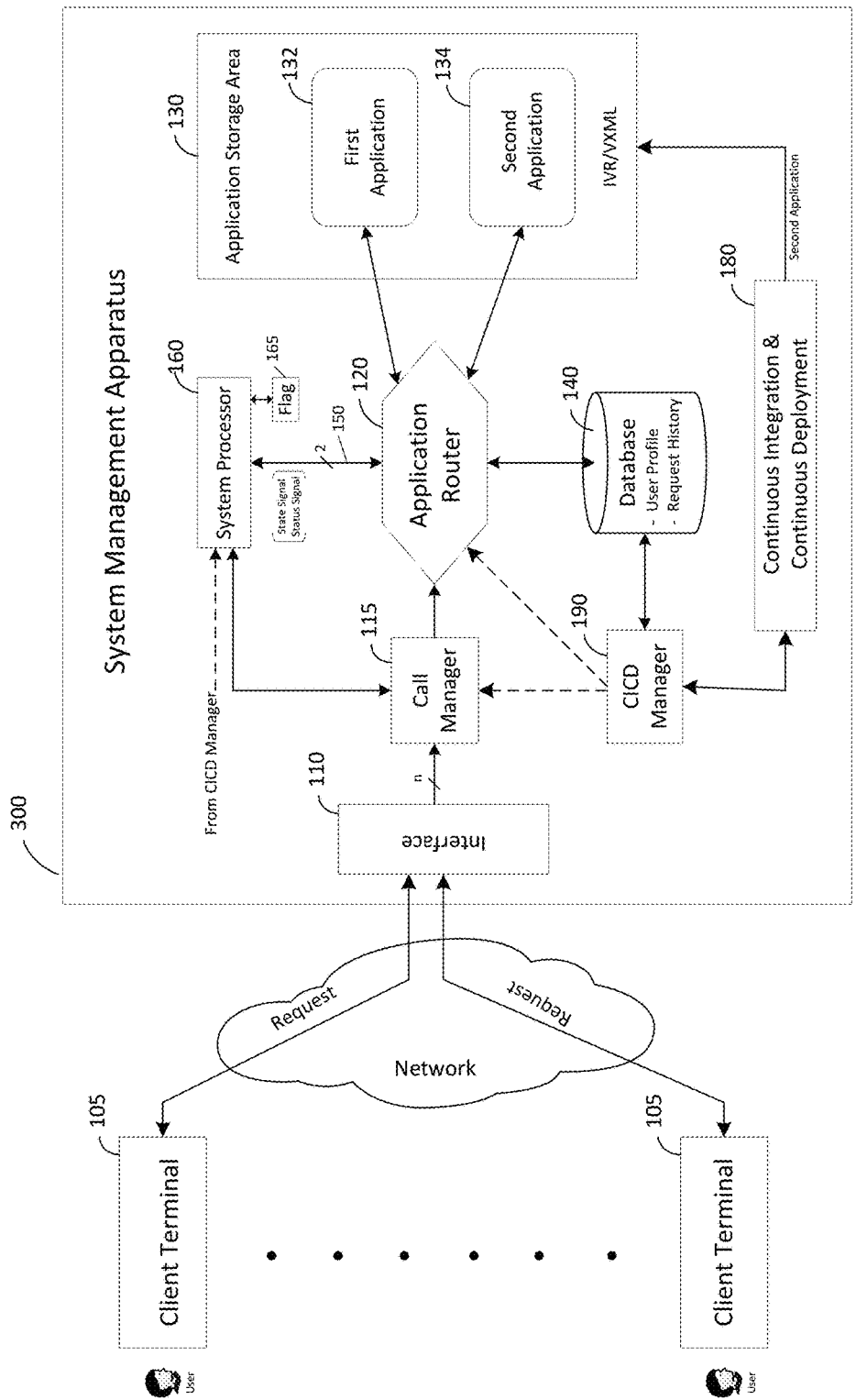
FIG. 3 shows another embodiment of an apparatus to manage requests and applications in a system coupled to a network.

FIG. 3 shows another embodiment of an apparatus 300 for managing information and applications in a system coupled to a network. The embodiment of FIG. 3 has features similar to many of those in the embodiment of FIG. 1.

Referring to FIG. 3, apparatus 300 includes a call manager 115, a continuous integration and continuous deployment (CICD) process flow 180, and a CICD manager 190.

The call manager 115 may perform various operations before an incoming call reaches the application router 120. These operations include, for example, determining the purpose of an in-coming call and/or whether the call is to be processed or managed by applications in the application storage area 130. This may be determined, for example, based on one or more initial menu selections made by a user of the call, based on the phone number to which the call was made, caller ID or user profile information, and/or based on other information. The call manager 115 may also determine whether the call is an initial call or in-progress call, a function which may be performed by the system processor 160 in other embodiments.

The CICD process flow 180 includes a number of stages for testing an application (e.g., second application 134) prior to deployment in the system. The stages may include, for example, a continuous integration stage, a code compilation stage, and unit tests stage, and a code coverage stage. One or more stages of the CICD process flow may generate metrics for determining tests results, which may serve as a basis for determining an overall level of performance of the tested application prior to deployment.

The CICD manager 190 may store the tests results from the stages or information determining the performance level of the application in database 140, for later use in determining to which application a call will be routed. The CICD manager 190 may also communicate with the call manager 115 and/or system processor 160 for determining information to be used by the application router 120 in routing incoming calls. The system processor 160 may include or be coupled to a register 165 for storing a flag indicating the state of the system, which state is used as a basis by application router 120 to route calls.

Figure 4:
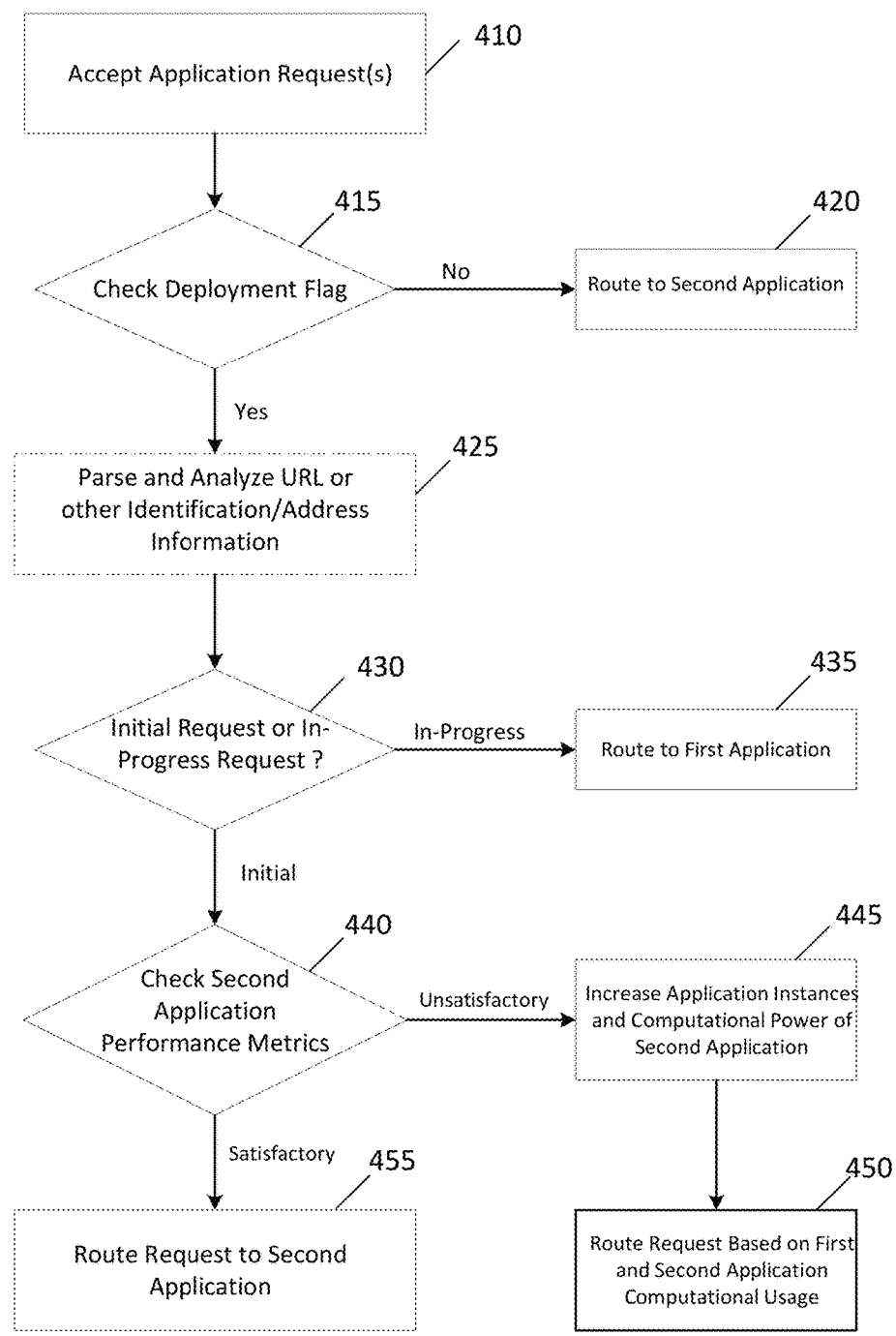
FIG. 4 shows another embodiment of a method to manage requests and applications in a system coupled to a network.

FIG. 4 shows another embodiment of a method 400 for managing information and applications in a system coupled to a network. The method may be performed, in whole or part, by the apparatus 300 of FIG. 3 or by a different apparatus. For illustrative purposes, the method 400 will be described with reference to apparatus 100.

In this embodiment, applications 132 and 134 manage call processing in an interactive voice response (IVR) system or a voice XML system. For example, applications 132 and 134 may process a call by directing users through one or more menu options or levels. Responses to menu selections may control further processing of the call. The history and actions taken during the call may be stored, for example, in database 140 for future reference and/or to perform other operations. As in other embodiments, applications 132 and 134 may be different versions of the same application or may be different applications.

At 410, a request is received at the interface 110. The request is interpreted by a call manager 115 to require processing by one of the applications in the application storage area 130. The call manager 115 may be logic, for example, that includes or is connected between the interface 110 and the application router 120, or may be the system processor 160, which in this case may be coupled between interface 110 and application router 120 for interpreting a purpose of the call, either based on a voice input or a dialed input, or both.

At 415, once the determination has been made that the call requires processing from one of the applications 132 and 134, the call manager 115 or system processor 160 performs a check to determine whether a zero downtime deployment flag has been set. The flag may correspond to one or more bits stored in a register 165 (e.g., see FIG. 1). The flag may have been set by processor 160 based on information received, for example, from the CICD manager 190 in the system. The CICD manager 190 may receive metrics from the CICD process flow 180 for, among other things, setting the deployment flag. The CICD process flow 180 may include, for example, a series of stages that are used by software developers or automated tools, or both, to develop and test an application (e.g., second application 134) for deployment.

The CICD manager 190 may output a signal to the system processor 160 for the purpose of setting the flag. The flag may be set to a first value indicating that the period of deployment for the second application 134 has been initiated. The flag may be set to a second value indicating that the period of deployment has ended, or deployment is not occurring, based on subsequent information output from the CICD manager 190 to the system processor 160.

At 420, the application router 120 receives the call (e.g., from interface 110 or call manager 115) and makes a decision on where to route the call. The application router 120 may make this decision initially based on the state of the system. The state of the system may be determined, for example, based on whether or not the deployment flag has been set, that is, whether or not the period of deployment for the second application 134 currently exists. If the flag indicates that the period of deployment does not exist, the application router 120 routes the call to the second application 134, which, for example, may be the most recent version of an IVR or VXML application.

At 425, if the zero downtime deployment flag is checked, indicating that the deployment period for the second application 134 exists and a user of a client terminal makes the call (e.g., through VoIP) or contacts the system through one or more websites or website addresses, then the system processor 160 parses and analyzes the corresponding URL.

For example, end users of the client terminals may reach the host system (or company) through various channels, e.g., an IVR, SMS, Facebook chat, or other ways. This translates to different URLs for the system and the client terminal. The incoming URL (e.g., the URL of the end user client terminal) may be parsed and analyzed to identify the type of input channel the call or request was received from. Thus, the analysis at 425 may involve identifying which channel the request or call is received from and which stage of the conversion exists with the user. The following are examples of the channels:

https://appname.env.west.com/SMS/index
https://appname.env.west.com/IVR/index

In the case of a call, if the call or conversion is not the first call or conversation, the URL may change to another channel, e.g., https://appname.env.west.com/IVR/prompt.

At 430, the application router 120 determines the status of the request. In one embodiment, this involves determining whether the call is an initial call or an in-progress call. As previously indicated, an initial call may be one received during the period of deployment of the second application 134, as determined by the call manager 115 or system processor 160. An in-progress call may be one received before the period of deployment of the second application 134 and management of the call is still active and on-going into the deployment period.

In one embodiment, operation 430 may involve determining whether the call is a first call or conversation by the end user or a subsequent call or conversation by the end user. This may be determined, for example, based on log or call history information stored in database 140. If the call is a first call or conversation, operation 430 may identify the call as an initial call. If the call is a subsequent call, operation 430 may determine the call or conversation to be an in-progress or repeat call. This is especially the case when the end user is calling back regarding an issue handled in the past.

At 435, the application router 120 routes the call to the first application 132 if the call is an in-progress call.

At 440, the application router determines that the call is an initial call, for example, based on the status signal determined by the call manager or the system processor 160, as previously described. At this time, the call may be routed to the second application 134 for processing.

In one embodiment, the call may not yet be routed to the second application 134 once the call has been determined to be an initial call. Instead, at 440, a check may be performed to analyze performance metrics of the second application, as determined, for example, by tests performed by stages in the CICD process flow 180. The performance metrics may have been stored by the CICD manager 115 in database 140 for later output to the application router 120 when queried. The performance metrics may include, for example, one or more of continuous integration metrics, code compilation metrics, unit test metrics, code coverage metrics, and/or other metrics or parameters indicative of the quality and performance state of the second application 134 being deployed.

At 445, when the performance metrics are unsatisfactory (e.g., does not satisfy one or more predetermined standards), the number of instances of the second application 134 may be increased, along with the computation power of the second application 134. The increased number of instances of the application 134 may be used to handle other calls, which may be useful especially when the computational power of the application is considered to be low or otherwise inadequate. These operations may be performed, for example, by the call manager 115, the system processor 160, or the application router 120 in accordance with control logic.

In one embodiment, increasing computational power may involve scaling up allocated memory and CPU usage for the application. This will allow the application to handle an increased number of requests (e.g., calls) or other traffic. This may be accomplished, for example, based on an automatic scaling command by a cloud (or other network) vendor. Application usage metrics may be checked and commands issued to increase the allocated memory and CPU usage.

At 450, once the application instances and computational power of the second application 134 have been increased, the application router 120 may route the call to the first application 132 or the second application 134 depending on the current usage of the first and second applications. For example, if use of the first application 132 is determined to be relatively low, e.g., below a first predetermined level, then the application router 120 may route the call (and subsequent calls, e.g., during the deployment period) to the first application 132. On the other hand, if use of the first application 132 is relatively high, e.g., above the first predetermined level (or above a second predetermined level greater than the first predetermined level), then the application router 120 may route the call (and subsequent calls, e.g., during the deployment period) to the second application 134.

In one embodiment, if use of (e.g., traffic to) the first application 132 is greater than use of (e.g., traffic to) the second application 134, the application router 120 may route the call to the second application. Conversely, if use of the first application 132 is less than use of the second application 134, then the application router 120 may route the call to the first application 132. Use of the applications 132 and 134 may be determined, for example, by the call manager 115, system processor 160, or application router 120 in accordance with control logic, which outputs a signal indicative of the usage.

At 455, when the performance metrics are determined to be satisfactory at 440, then the application router 120 routes the call to the second application 134 if the call is an initial call.

These and other embodiments described herein allow requests in an IVR or VXML system to be processed and managed in a continuous manner that is seamless to the users of the client terminals making the requests. At the same time, at least one of the applications used to manage the requests may enter into a zero downtime mode (or at least a mode where a limited number of requests are processed) during a period of deployment of that application. This may be accomplished by directing at least some of the requests (and/or other traffic) to another application during the deployment period. As a result, requests are handled in a more efficient manner with fewer system delays.

The operations of the method and apparatus embodiments described herein may be implemented in hardware, in a computer program executed by a processor, or in a combination of the two. When implemented at least partially in a computer program, the computer program may be stored on a computer readable medium. The computer readable medium may be, for example, a random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In one embodiment, the storage medium may be integral to the processor. The processor and the storage medium may reside in an application specific integrated circuit ("ASIC"). In one embodiment, the processor and the storage medium may reside as discrete components.

Figure 5:
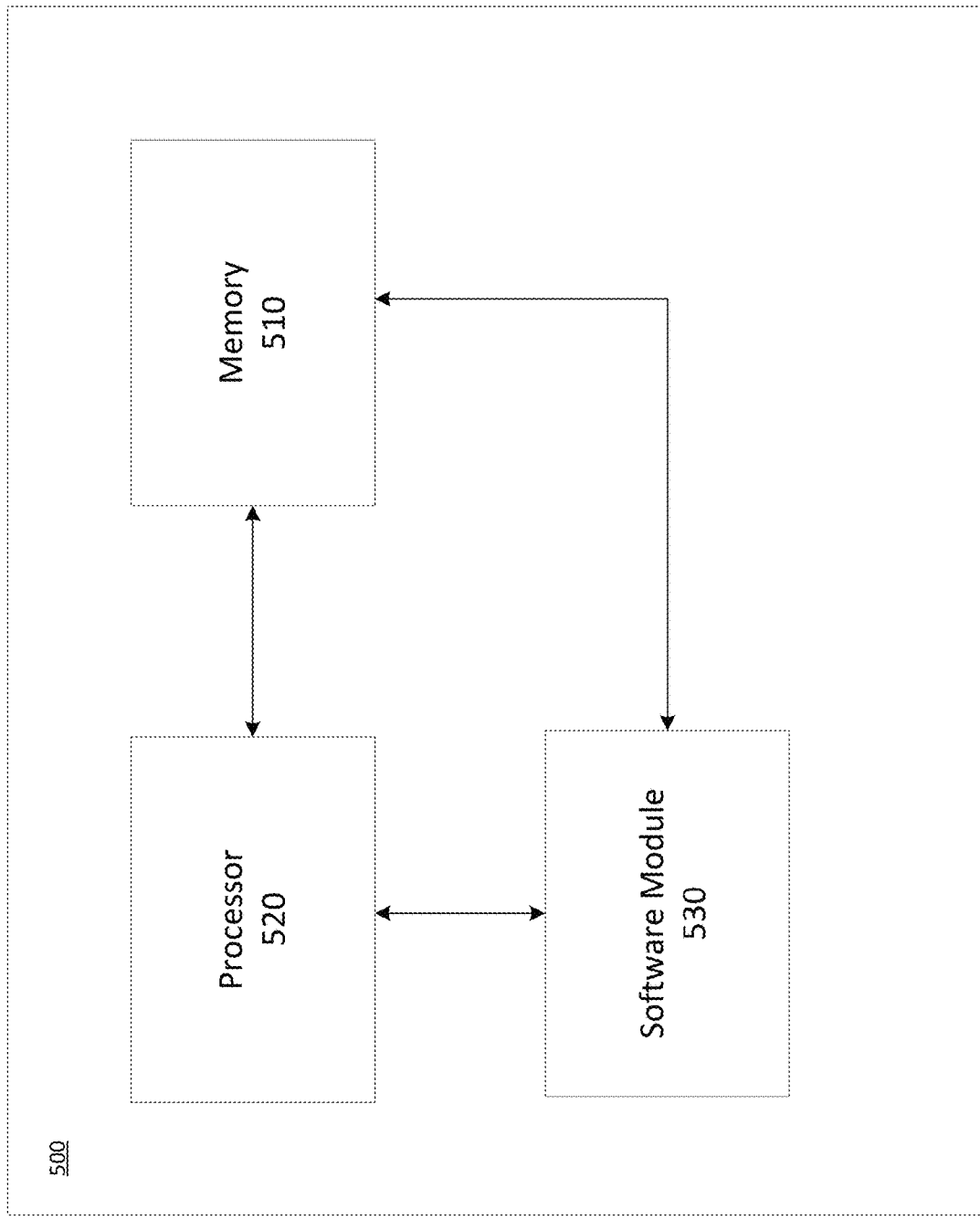
FIG. 5 shows an embodiment of a system that may implement the method embodiments.

FIG. 5 shows an example element 500 which includes a memory 510 and a processor 520, which may be discrete components used to execute operations of the apparatus and method embodiments. The operations may be implemented by an application coded in software in a computer language understood by the processor 520. Such an application may be stored in a computer readable medium, such as, memory 510.

The application may be control software including instructions for causing the processor 520 to perform operations of the embodiments described herein. For example, the processor 520 may correspond to a processor of the application router and the memory 510 may store a control program and logic for controlling processor 520 to determine the operations of the application router of the embodiments described herein.

The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components, the network entity 500 may have a transmitter and receiver pair configured to receive and transmit communication signals (not shown).

While some of the embodiments described herein relate to processing information and requests received from a network, other embodiments may route requests or other information in standalone system or a system not connected to a network.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

The methods, processes, and/or operations described herein may be performed by code or instructions to be executed by a computer, processor, controller, manager, router, or other signal processing device. The computer, processor, controller, manager, router, or other signal processing device may be those described herein or one in addition to the elements described herein. Because the algorithms that form the basis of the methods (or operations of the computer, processor, controller, manager, router, or other signal processing device) are described in detail, the code or instructions for implementing the operations of the method embodiments may transform the computer, processor, controller, manager, router, or other signal processing device into a special-purpose processor for performing the methods described herein.

In addition, the processors, managers, routers, or other processing features of the embodiments disclosed herein may be implemented in logic which, for example, may include hardware, software, or both. When implemented at least partially in hardware, the processors, managers, routers, or other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, mangers, routers, or other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein. The term "device unit data" may be or include card unique data or other type of unique device-specific data.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto. The features of one embodiment may be combined features of one or more other embodiments to form new embodiments.

What is claimed is:

1. A method comprising:
   receiving, by a computer device storing a first application and a second application, a request from a network;
   identifying a state of a system coupled to the network;
   identifying a status of the request as one of:
      an initial request that is received during a period of deployment of the second application, or
      an in-progress request that is received before the period of deployment of the second application;
   routing the request to the first application based on both the identifying the status of the request as the initial request and a current state of the system related to deployment of the second application; and
   routing the request to the second application based on both the identifying the status of the request as the in-progress request and the current state of the system related to deployment of the second application.

2. The method of claim 1, wherein the current state corresponds to a period of deployment of the second application.

3. The method of claim 1, wherein the first application and the second application are different versions of a same application.

4. The method of claim 1, wherein the request is a call or electronic message.

5. The method of claim 1, wherein the system is an interactive voice recognition system or a VXML system.

6. An apparatus, comprising:
   at least one memory to store instructions and a first application and a second application; and
   at least one processor to execute the instructions to:
      receive a request from a network,
      identify a state of a system coupled to the network,
      identify a status of the request as one of:
         an initial request that is received during a period of deployment of the second application,
         an in-progress request that is received before the period of deployment of the second application,
      route the request to the first application based on both the identifying the status of the request as the initial request and a current state of the system related to deployment of the second application, and
      route the request to the second application based on both the identifying the status of the request as the in-progress request and the current state of the system related to deployment of the second application.

7. The apparatus of claim 6, wherein the current state corresponds to a period of deployment of the second application.

8. The apparatus of claim 6, wherein the first application and the second application are different versions of a same application.

9. The apparatus of claim 6, wherein the request is a call or electronic message.

10. The apparatus of claim 6, wherein the system is an interactive voice recognition system or a VXML system.

11. A non-transitory computer readable storage medium storing instructions that when executed by a processor of a computer device storing a first application and a second application cause the processor to:
   receive a request from a network;

identify a state of a system coupled to the network;
determine a status of the request from the network;
identify a status of the request as one of:
    an initial request that is received during a period of deployment of the second application,
    an in-progress request that is received before the period of deployment of the second application,
route the request the first application based on both the identifying the status of the request as the initial request and a current state of the system related to deployment of the second application; and
route the request to the second application based on both the identifying the status of the request as the in-progress request and the current state of the system related to deployment of the second application.

12. The non-transitory computer readable storage medium of claim 11, wherein the current state corresponds to a period when the second application is being deployed in the network.

13. The non-transitory computer readable storage medium of claim 11, wherein the first application and the second application are different versions of a same application.

14. The non-transitory computer readable storage medium of claim 11, wherein the request is a call or electronic message.

15. The non-transitory computer readable storage medium of claim 11, wherein the system is an interactive voice recognition system or a VXML system.

\* \* \* \* \*